United States Patent [19]

Hilferink et al.

[11] Patent Number: 5,148,404

[45] Date of Patent: Sep. 15, 1992

[54] TRANSPONDER AND METHOD FOR THE PRODUCTION THEREOF

[75] Inventors: Henk Hilferink, Diepenheim; Anne A. Tip, Hengelo; Henk Velten, Enter, all of Netherlands

[73] Assignee: Texas Instruments Incorporated, Dallas, Tex.

[21] Appl. No.: 773,837

[22] Filed: Oct. 9, 1991

[30] Foreign Application Priority Data

Oct. 9, 1990 [NL] Netherlands ........................ 9002191

[51] Int. Cl.$^5$ .............................................. H04B 1/59
[52] U.S. Cl. ..................................................... 367/2
[58] Field of Search ................. 367/2; 342/51; 501/68

[56] References Cited

U.S. PATENT DOCUMENTS 5,025,550  6/1991  Zirbes et al. ........................... 29/605

Primary Examiner—Daniel T. Pihulic
Attorney, Agent, or Firm—James C. Kesterson; Richard L. Donaldson

[57] ABSTRACT

The invention relates to a transponder comprising a closed glass casing in which electrical components are placed, wherein the glass incorporates iron oxide, a method for the production of such a transponder, the use of iron oxide in the glass of a closed glass casing of a transponder and a method for the identification of animals with the use of such a transponder.

12 Claims, 1 Drawing Sheet

U.S. Patent  Sep. 15, 1992  5,148,404
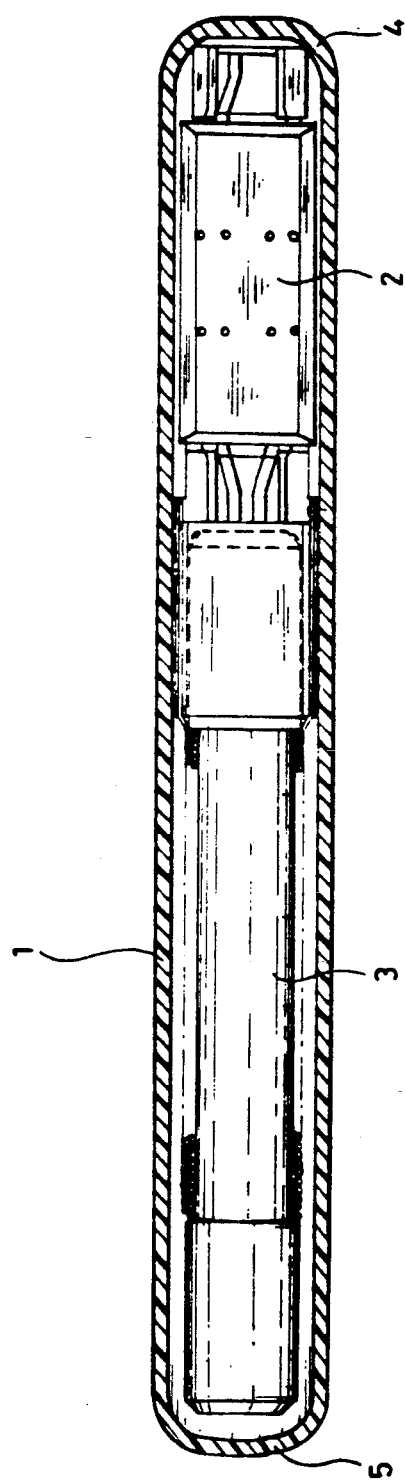

TRANSPONDER AND METHOD FOR THE PRODUCTION THEREOF

The present invention relates to a transponder comprising a closed glass casing in which electrical components are placed.

A transponder of this type is generally known in the prior art. Glass is preferred to plastic for the casing because complete tightness can be guaranteed only with glass. When plastic is used it has been found that diffusion of moisture from the environment towards the interior takes place, as a result of which the electrical components can be damaged. Transponders of this type are used for many applications, but the transponder described here will be used in particular for fitting in living creatures. The fitting of transponders in living creatures has already been known for a long time and serves for the identification thereof. To this end, the transponder contains an aerial, a transmitter/receiver and a memory. On irradiation of the transponder, the energy supplied will be used to transmit the data present in the memory, each transponder having its own coding. In this way, living creatures can be recognised individually. Transponders can be fitted in living creatures in numerous locations. One application of transponders is in cattle for slaughter. After all, it is particularly important to known the life history of the animals before and/or during slaughter. For this reason, a transponder is already fitted in the animal concerned at a young age. It is important that the transponder does not disappear from the body, that is to say does not emerge again through the channel formed in the body of the animal or does not disappear if the animal is wounded. On the other hand, it is important that the transponder can be readily found at the time of slaughter.

Transponders made of ordinary clear $SiO_2$ glass, which are customary in the state of the art, were found not to satisfy these requirements. The aim of the present invention is to provide a transponder which does not have these disadvantages.

This aim is achieved by means of a transponder described above in that the glass contains iron oxide incorporated therein.

Surprisingly, it has been found that by adding iron oxide to the glass a better adhesion takes place between the glass and the tissue of the living creature, so that even if the transponder is carried for a prolonged period, such as, in particular, takes place in the case of horses, it can be guaranteed that at the time of slaughter the transponder is still always in the vicinity of the site of fitting. Moreover, glass in which iron oxide has been incorporated is somewhat green in colour, which provides a contrast with the somewhat red tissue of the animal on slaughter. It is therefore possible easily to find the transponder again at the time of slaughter.

According to an advantageous embodiment of the invention, the iron oxide comprises $Fe_2O_3$. Preferably, between 1 and 5% of iron oxide is present. The glass is preferably crystalline.

The invention also relates to a method for the production of a transponder as described above. In the case of the prior art, a tubular part is provided which is already sealed on one side. The electrical components are then introduced and the other side is sealed. This sealing can take place in various ways, but it is important that it takes place in a clean, reproducible manner with which no problems with contamination arise. To date, it was customary to seal transponders of this type with the aid of a flame. It has now been found that in the case of glass containing iron oxide, the sealing can be carried out particularly well by means of infrared welding. As a result, no problems arise with regard to the reproducibility and contamination originating from the gas flame. High-frequency welding is also possible.

The invention further relates to the use of iron oxide in the glass of a closed glass casing of a transponder and to a method for identifying animals with the use of a transponder according to the invention or obtainable according to the method of the invention as described in the above.

The invention will be explained in more detail below with reference to an illustrative embodiment shown in the drawing. In this drawing the single figure shows a transponder in cross section.

The transponder shown in the figure comprises a casing 1 with a receiver/memory/transmitter unit 2 and a ferrite aerial 3 installed therein. Transponders of this type are, for example, introduced with the aid of guns into living creatures for the identification thereof. The transponder is produced by providing a glass tube which is closed at one end 4 and is open at the other end 5. After introduction of the components 2 and 3, end 5 is closed by means of infrared welding. During welding the end 5 fuses together. This can be promoted by pulling away. The composition of the glass of the transponder shown here is as follows:

$SiO_2$: about 70% by weight;
$B_2O_3$: 1-2% by weight;
$Al_2O_3$: <5% by weight;
$Na_2O$: <15% by weight;
$K_2O$: <5% by weight;
$CaO$: <5% by weight;
$BaO$: <3% by weight and
$Fe_2O_3$: 1-5% by weight.

As a result of the presence of iron oxide, the glass acquires a somewhat green colour, which facilitates the removal from slaughtered cattle. Moreover, better adhesion to the tissue of the living creature is found to be achieved as a result of the presence of iron oxide in the glass.

As a result of the use of iron oxide it is no longer necessary to seal the free end of the casing of the transponder with the aid of a flame, by which means contamination can be introduced, but it is now possible to achieve sealing with the aid of infrared radiation.

Although the invention has been illustrated above with reference to a preferred embodiment, it must be understood that numerous modification can be made thereto without going beyond the scope of the application. Thus, the transponder can have a different shape and the glass casing can be provided with further means for promoting the adhesion between the transponder and the living creature, as described in Netherlands Patent Application 9001777. All of these modifications lie within the scope of the appended claims.

We claim:

1. Transponder comprising a closed glass casing in which electrical components are placed, characterised in that the glass incorporates iron oxide.

2. Transponder according to claim 1 characterised in that the iron oxide comprises $Fe_2O_3$.

3. Transponder according to one of the preceding claims, characterised in that the glass comprises between 1 and 5% by weight iron oxide.

4. Transponder according to claim 3, characterised in that the glass furthermore comprises about 70% by weight $SiO_2$, 1-2% by weight $B_2O_3$, 0-5% by weight $Al_2O_3$, 0-15% by weight $Na_2O_3$, 0-5% by weight $K_2O_3$, 0-5% by weight CaO and 0-3% by weight BaO.

5. A transponder according to claim 1 characterized in that the glass comprises crystalline glass.

6. A method for the production of a transponder comprising the steps of providing a tubular glass casing, introducing therein said electrical component, heat sealing of at least one end of said glass.

7. The method according to claim 6, characterized in that the heat sealing comprises infrared welding.

8. The method according to claim 6, characterized in that the heat sealing comprises high frequency welding.

9. Use of iron oxide in the glass of a closed glass casing of a transponder.

10. The transponder of claim 1, wherein said transponder is used to identify animals.

11. The transponder of claim 1, wherein said closed glass casing of said transponder is green.

12. The method of claim 6 and further comprising the step of using said transponder to identify animals.

* * * * *